(12) United States Patent
Turner et al.

(10) Patent No.: US 9,217,603 B2
(45) Date of Patent: Dec. 22, 2015

(54) HEAT EXCHANGER AND RELATED METHODS

(75) Inventors: Terry D. Turner, Idaho Falls, ID (US); Michael G. McKellar, Idaho Falls, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 1050 days.

(21) Appl. No.: 12/938,826

(22) Filed: Nov. 3, 2010

(65) Prior Publication Data

US 2012/0103561 A1    May 3, 2012

(51) Int. Cl.
| | |
|---|---|
| F24H 3/00 | (2006.01) |
| F25B 29/00 | (2006.01) |
| F25J 3/06 | (2006.01) |
| F25J 5/00 | (2006.01) |
| F28C 3/08 | (2006.01) |

(52) U.S. Cl.
CPC ........ *F25J 3/067* (2013.01); *F25J 3/061* (2013.01); *F25J 3/0635* (2013.01); *F25J 5/002* (2013.01); *F28C 3/08* (2013.01); *F25J 2205/20* (2013.01); *F25J 2220/82* (2013.01); *Y02C 10/12* (2013.01)

(58) Field of Classification Search
CPC .............. F28C 3/10; F28C 3/08; F25J 3/061; F25J 3/0635; F25J 3/067; F25J 5/002; F25J 2205/20; F25J 2220/82
USPC ............................. 62/54.2; 165/61; 366/101
See application file for complete search history.

(56) References Cited

U.S. PATENT DOCUMENTS

| | | | |
|---|---|---|---|
| 1,222,801 A | 4/1917 | Rosenbaum | |
| 2,037,679 A | 4/1936 | Dana | |
| 2,037,714 A | 4/1936 | Gaines, Jr. | |
| 2,040,059 A | 5/1936 | Mesinger | |
| 2,093,805 A | 9/1937 | de Baufre | |
| 2,157,103 A | 5/1939 | Zenner | |
| 2,209,534 A | 7/1940 | Moore | |

(Continued)

FOREIGN PATENT DOCUMENTS

| | | |
|---|---|---|
| CN | 101539362 | 9/2009 |
| EP | 0 676 599 A | 10/1995 |
| EP | 1 205 721 A1 | 5/2002 |
| FR | 2805034 | 8/2001 |
| GB | 1135871 | 12/1968 |

(Continued)

OTHER PUBLICATIONS

Bodner Research Web, "Phase Diagrams," http://chemed.chem.purdue.edu/genchem/topicreview/bp/ch14/phase.php.

(Continued)

*Primary Examiner* — Frantz Jules
*Assistant Examiner* — Webeshet Mengesha
(74) *Attorney, Agent, or Firm* — TraskBritt

(57) ABSTRACT

Heat exchangers include a housing having an inlet and an outlet and forming a portion of a transition chamber. A heating member may form another portion of the transition chamber. The heating member includes a first end having a first opening and a second end having a second opening larger than the first opening. Methods of conveying a fluid include supplying a first fluid into a transition chamber of a heat exchanger, supplying a second fluid into the transition chamber, and altering a state of a portion of the first fluid with the second fluid. Methods of sublimating solid particles include conveying a first fluid comprising a material in a solid state into a transition chamber, heating the material to a gaseous state by directing a second fluid through a heating member and mixing the first fluid and the second fluid.

16 Claims, 4 Drawing Sheets

(56) References Cited

U.S. PATENT DOCUMENTS

| | | |
|---|---|---|
| 2,494,120 A | 10/1950 | Ferro, Jr. |
| 2,669,941 A | 2/1954 | Stafford |
| 2,701,641 A | 2/1955 | Krijgsman |
| 2,830,769 A | 4/1958 | Work |
| 2,858,020 A | 10/1958 | Bek |
| 2,900,797 A | 8/1959 | Kurata et al. |
| 2,937,503 A | 5/1960 | Swearingen et al. |
| 3,132,016 A | 5/1964 | Kurata |
| 3,168,136 A | 2/1965 | Ammon |
| 3,182,461 A | 5/1965 | Johanson |
| 3,193,468 A | 7/1965 | Sprague |
| 3,213,631 A | 10/1965 | Kniel |
| 3,218,816 A | 11/1965 | Grenier |
| 3,236,057 A | 2/1966 | Hashemi-Tafreshi |
| 3,254,496 A | 6/1966 | Roche et al. |
| 3,283,521 A | 11/1966 | Harmens |
| 3,289,756 A | 12/1966 | Jaeger |
| 3,292,380 A | 12/1966 | Bucklin |
| 3,310,843 A * | 3/1967 | Arion Mancuso ......... 222/146.1 |
| 3,312,073 A | 4/1967 | Jackson et al. |
| 3,315,475 A | 4/1967 | Harmens |
| 3,323,315 A | 6/1967 | Carr |
| 3,326,453 A | 6/1967 | Kun |
| 3,349,020 A | 10/1967 | Crownover et al. |
| 3,362,173 A | 1/1968 | Kniel |
| 3,376,709 A | 4/1968 | Dickey et al. |
| 3,406,496 A | 10/1968 | Betteridge et al. |
| 3,407,052 A | 10/1968 | Huntress et al. |
| 3,416,324 A | 12/1968 | Swearingen |
| 3,422,887 A | 1/1969 | Berkeley |
| 3,448,587 A | 6/1969 | Goard et al. |
| 3,487,652 A | 1/1970 | McKay |
| 3,503,220 A | 3/1970 | Desai |
| 3,516,262 A | 6/1970 | Bernstein |
| 3,548,606 A | 12/1970 | Kuerston |
| 3,596,473 A | 8/1971 | Streich |
| 3,608,323 A | 9/1971 | Salama |
| 3,616,652 A | 11/1971 | Engel |
| 3,628,340 A | 12/1971 | Meisler et al. |
| 3,667,234 A | 6/1972 | De Lizasoain |
| 3,677,019 A | 7/1972 | Olszewski |
| 3,690,114 A | 9/1972 | Swearingen et al. |
| 3,724,225 A | 4/1973 | Mancini et al. |
| 3,724,226 A | 4/1973 | Pachalay |
| 3,735,600 A | 5/1973 | Dowdell et al. |
| 3,846,993 A | 11/1974 | Bates |
| 3,886,885 A | 6/1975 | Becker et al. |
| 3,897,226 A | 7/1975 | Doherty |
| 4,001,116 A | 1/1977 | Selcukoglu |
| 4,004,430 A | 1/1977 | Solomon et al. |
| 4,007,601 A | 2/1977 | Webbon |
| 4,022,597 A | 5/1977 | Bacon |
| 4,025,315 A | 5/1977 | Mazelli |
| 4,032,337 A | 6/1977 | Boyer |
| 4,120,911 A | 10/1978 | Davidson |
| 4,128,410 A | 12/1978 | Bacon |
| 4,148,723 A | 4/1979 | Mozley |
| 4,161,107 A | 7/1979 | Chernyshev et al. |
| 4,183,369 A | 1/1980 | Thomas |
| 4,187,689 A | 2/1980 | Selcukoglu et al. |
| 4,294,274 A | 10/1981 | LeRoy |
| 4,318,723 A | 3/1982 | Holmes et al. |
| 4,334,902 A | 6/1982 | Paradowski |
| 4,359,871 A | 11/1982 | Strass |
| 4,370,150 A | 1/1983 | Fenstermaker |
| 4,453,956 A | 6/1984 | Fabbri et al. |
| 4,456,459 A | 6/1984 | Brundige |
| 4,479,533 A | 10/1984 | Persson et al. |
| 4,479,536 A | 10/1984 | Lameris |
| 4,522,636 A | 6/1985 | Markbreiter et al. |
| 4,528,006 A | 7/1985 | Vitovec et al. |
| 4,561,496 A | 12/1985 | Kehrer |
| 4,609,390 A | 9/1986 | Wilson |
| 4,611,655 A | 9/1986 | Molignoni |
| 4,645,522 A | 2/1987 | Dobrotwir |
| 4,654,522 A | 3/1987 | Gornick et al. |
| 4,783,272 A | 11/1988 | Patterson |
| 4,798,242 A | 1/1989 | Kito et al. |
| 4,822,393 A | 4/1989 | Markbreiter et al. |
| 4,846,862 A | 7/1989 | Cook |
| 4,869,313 A | 9/1989 | Fredley |
| 4,970,867 A | 11/1990 | Harron et al. |
| 4,993,485 A | 2/1991 | Gorman |
| 4,994,097 A | 2/1991 | Brouwers |
| 5,003,782 A | 4/1991 | Kucerija |
| 5,032,143 A | 7/1991 | Ritakallio |
| 5,036,671 A | 8/1991 | Nelson et al. |
| 5,062,270 A | 11/1991 | Haut et al. |
| 5,074,758 A | 12/1991 | McIntyre |
| 5,174,796 A | 12/1992 | Davis et al. |
| 5,218,832 A | 6/1993 | Woolley |
| 5,252,613 A | 10/1993 | Chang et al. |
| 5,291,736 A | 3/1994 | Paradowski |
| 5,325,673 A | 7/1994 | Durr et al. |
| 5,327,730 A | 7/1994 | Myers et al. |
| 5,375,422 A | 12/1994 | Butts |
| 5,379,832 A | 1/1995 | Dempsey |
| 5,386,699 A | 2/1995 | Myers et al. |
| 5,390,499 A | 2/1995 | Rhoades et al. |
| 5,419,392 A | 5/1995 | Maruyama |
| 5,450,728 A | 9/1995 | Vora et al. |
| 5,473,900 A | 12/1995 | Low |
| 5,489,725 A | 2/1996 | Minkkinen et al. |
| 5,505,048 A | 4/1996 | Ha et al. |
| 5,505,232 A | 4/1996 | Barclay |
| 5,511,382 A | 4/1996 | Denis et al. |
| 5,537,827 A | 7/1996 | Low et al. |
| 5,551,256 A | 9/1996 | Schmidt |
| 5,600,969 A | 2/1997 | Low |
| 5,615,561 A | 4/1997 | Houshmand et al. |
| 5,615,738 A | 4/1997 | Cameron et al. |
| 5,655,388 A | 8/1997 | Bonaquist et al. |
| 5,669,234 A | 9/1997 | Houser et al. |
| 5,704,227 A | 1/1998 | Krabbendam |
| 5,718,126 A | 2/1998 | Capron et al. |
| 5,755,114 A | 5/1998 | Foglietta |
| 5,755,280 A | 5/1998 | Da Costa et al. |
| 5,799,505 A | 9/1998 | Bonaquist et al. |
| 5,819,555 A | 10/1998 | Engdahl |
| 5,836,173 A | 11/1998 | Lynch et al. |
| 5,916,260 A | 6/1999 | Dubar |
| 5,950,453 A | 9/1999 | Bowen et al. |
| 5,956,971 A | 9/1999 | Cole et al. |
| 5,983,665 A | 11/1999 | Howard et al. |
| 6,023,944 A | 2/2000 | Blundell |
| 6,041,620 A | 3/2000 | Olszewski et al. |
| 6,085,546 A | 7/2000 | Johnston |
| 6,085,547 A | 7/2000 | Johnston |
| 6,105,390 A | 8/2000 | Bingham et al. |
| 6,131,395 A | 10/2000 | Greene et al. |
| 6,131,407 A | 10/2000 | Wissolik |
| 6,138,473 A | 10/2000 | Boyer-Vidal |
| 6,138,746 A | 10/2000 | Livolsi et al. |
| 6,196,021 B1 | 3/2001 | Wissolik |
| 6,200,536 B1 | 3/2001 | Tonkovich et al. |
| 6,212,891 B1 | 4/2001 | Minta et al. |
| 6,220,052 B1 | 4/2001 | Tate, Jr. et al. |
| 6,220,053 B1 | 4/2001 | Hass et al. |
| 6,250,244 B1 | 6/2001 | Dubar et al. |
| 6,295,833 B1 | 10/2001 | Hoffart et al. |
| 6,301,927 B1 | 10/2001 | Reddy |
| 6,354,105 B1 | 3/2002 | Lee et al. |
| 6,367,286 B1 | 4/2002 | Price |
| 6,370,910 B1 | 4/2002 | Grootjans et al. |
| 6,372,019 B1 | 4/2002 | Alferov et al. |
| 6,375,906 B1 | 4/2002 | Edlund et al. |
| 6,378,330 B1 | 4/2002 | Minta et al. |
| 6,382,310 B1 | 5/2002 | Smith |
| 6,389,844 B1 | 5/2002 | Klein Nagel Voort |
| 6,390,114 B1 | 5/2002 | Haandrikman et al. |
| 6,397,936 B1 | 6/2002 | Crowley et al. |
| 6,400,896 B1 | 6/2002 | Longardner |
| 6,410,087 B1 | 6/2002 | Wilde et al. |
| 6,412,302 B1 | 7/2002 | Foglietta |

(56) References Cited

U.S. PATENT DOCUMENTS

| | | | |
|---|---|---|---|
| 6,425,263 B1 | 7/2002 | Bingham et al. | |
| 6,427,464 B1 | 8/2002 | Beaverson et al. | |
| 6,441,263 B1 | 8/2002 | O'Rear et al. | |
| 6,442,969 B1 | 9/2002 | Rojey et al. | |
| 6,446,465 B1 | 9/2002 | Dubar | |
| 6,484,533 B1 | 11/2002 | Allam et al. | |
| 6,581,409 B2 | 6/2003 | Wilding et al. | |
| 6,581,510 B2 | 6/2003 | Koch et al. | |
| 6,694,774 B1 | 2/2004 | Rashad et al. | |
| 6,722,399 B1 | 4/2004 | Cano | |
| 6,742,358 B2 | 6/2004 | Wilkinson et al. | |
| 6,767,388 B2 | 7/2004 | Lecomte et al. | |
| 6,793,712 B2 | 9/2004 | Qualls | |
| 6,962,060 B2 | 11/2005 | Petrowski et al. | |
| 6,962,061 B2 | 11/2005 | Wilding et al. | |
| 7,078,011 B2 | 7/2006 | Morrow | |
| 7,219,512 B1 | 5/2007 | Wilding et al. | |
| 7,228,714 B2 | 6/2007 | Howard | |
| 7,231,784 B2 | 6/2007 | Howard et al. | |
| 7,288,231 B2 | 10/2007 | Tonkovich et al. | |
| 7,325,415 B2 | 2/2008 | Amin et al. | |
| 7,469,556 B2 | 12/2008 | Howard | |
| 7,575,624 B2 | 8/2009 | Cartwright et al. | |
| 7,591,150 B2 | 9/2009 | Turner et al. | |
| 7,591,648 B2 * | 9/2009 | Mosiewicz | 431/351 |
| 7,594,414 B2 | 9/2009 | Wilding et al. | |
| 7,765,920 B2 | 8/2010 | Keller | |
| 8,245,727 B2 | 8/2012 | Mooney et al. | |
| 8,250,883 B2 | 8/2012 | Migliore et al. | |
| 8,650,906 B2 | 2/2014 | Price et al. | |
| 2002/0185011 A1 * | 12/2002 | Koch et al. | 99/348 |
| 2003/0196452 A1 | 10/2003 | Wilding et al. | |
| 2004/0083888 A1 | 5/2004 | Qualls | |
| 2004/0105812 A1 | 6/2004 | Tonkovich et al. | |
| 2004/0148962 A1 | 8/2004 | Rashad et al. | |
| 2004/0177646 A1 | 9/2004 | Wilkinson et al. | |
| 2005/0144979 A1 | 7/2005 | Zollinger et al. | |
| 2005/0183452 A1 | 8/2005 | Hahn et al. | |
| 2005/0220704 A1 | 10/2005 | Morrow et al. | |
| 2005/0279132 A1 | 12/2005 | Eaton et al. | |
| 2006/0053806 A1 | 3/2006 | Tassel | |
| 2006/0213222 A1 | 9/2006 | Whitesell | |
| 2006/0218939 A1 | 10/2006 | Turner et al. | |
| 2007/0017250 A1 | 1/2007 | Turner | |
| 2007/0107465 A1 | 5/2007 | Turner et al. | |
| 2007/0137246 A1 | 6/2007 | McKellar et al. | |
| 2007/0193303 A1 | 8/2007 | Hawrysz et al. | |
| 2008/0156035 A1 | 7/2008 | Aspelund et al. | |
| 2009/0071634 A1 * | 3/2009 | Turner et al. | 165/104.26 |
| 2009/0217701 A1 | 9/2009 | Minta et al. | |
| 2009/0248174 A1 | 10/2009 | Taha et al. | |
| 2009/0277217 A1 | 11/2009 | Ransbarger et al. | |
| 2010/0018248 A1 | 1/2010 | Fieler et al. | |
| 2010/0088920 A1 | 4/2010 | LaRou | |
| 2010/0186446 A1 | 7/2010 | Turner et al. | |
| 2010/0223950 A1 | 9/2010 | Malsam | |
| 2010/0313597 A1 | 12/2010 | Bridgwood | |
| 2011/0196159 A1 * | 8/2011 | De Munck et al. | 549/248 |
| 2012/0103012 A1 | 5/2012 | Turner et al. | |
| 2012/0103428 A1 | 5/2012 | Turner et al. | |
| 2013/0340475 A1 | 12/2013 | Turner et al. | |

FOREIGN PATENT DOCUMENTS

| | | |
|---|---|---|
| JP | 58-159830 | 9/1983 |
| JP | 11200817 A | 7/1999 |
| JP | 2002071861 A | 3/2002 |
| WO | 88/00936 | 2/1988 |
| WO | 98/59206 | 12/1998 |
| WO | 9859205 | 12/1998 |
| WO | 0144735 | 6/2001 |
| WO | 03/062725 A | 7/2003 |
| WO | 03064947 | 8/2003 |
| WO | 2005114076 | 12/2005 |
| WO | 2010023238 A1 | 3/2010 |

OTHER PUBLICATIONS

Search Report for PCT/US2006/041039 dated Aug. 8, 2007.
Search Report for PCT/US2007/084677 dated Jul. 1, 2008.
International Preliminary Report for PCT/US08/68938 dated Mar. 16, 2010.
Search Report for PCT/US2010/045340 dated Oct. 13, 2010.
Search Report for PCT/US2010/045332 dated Oct. 18, 2010.
Search Report for PCT/US2008/051012 dated May 20, 2008.
Search Report for PCT/US2010/045321 dated Oct. 1, 2010.
International Preliminary Examination Report for PCT/US2002/20924 dated Jun. 17, 2003.
Search Report for PCT/US1998/027232, dated Jul. 7, 1999.
A National Vision of America's Transition to a Hydrogen Economy-To 2030 and Beyond, Based on the results of the National Hydrogen Vision Meeting Washington, DC Nov. 15-16, 2001, United States Department of Energy.
Curtin University of Technology, LNG Microcell Progress Update, May 2002, Curtin/Corelab.
Generation of Hydrogen and Transportation and Transmission of Energy Generated on the U.S. Outer Continental Shelf to Onshore, (Minerals Management Service), May 2006.
Holmes et al., "Ryan/Holmes Cryogenic Acid Gas/Hydrocarbon Separations Provide Economic Benefits for LNG Production," 7th International Conference on Liquefied Natural Gas; Jakarta, Indonesia; May 1983; Institute of Gas Technology, Session II, vol. 1, P.
Hydrogen as an Energy Carrier and its Production by Nuclear Power, IAEA-TECDOC-1085, International Atomic Energy Agency, May 1999.
"Hydrogen Infrastructure Delivery, Reliability R&D Needs," Science Applications International Corporation, Prepared for U.S. Department of Energy, NETL Natural Gas & Infrastructure Reliability Program, 2007, <www.netl.doe.gov/technologies/oil-gas/publications/td/Final%20White%20Paper%20072604.pdf>.
International Search Report for PCT/US02/20924, dated Sep. 17, 2002 (4 pages).
Mott Corporation, "Porous metal solutions," Jun. 2007, 16 pages.
Porous Metal Design Guidebook, Metal Powder Industries Federation, Princeton, NJ, <<http://www.mpif.org/designcenter/porous.pdf>>, Jun. 2007, 25 pages.
The Hydrogen Economy: Opportunities, Costs, Barriers, and R&D Needs, National Academy of Engineering and Board on Energy and Environmental Systems, 2004, The National Academies Press, <http://books.nap.edu/books/0309091632/html/index.html>.
The Hydrogen Initiative, Panel on Public Affairs, American Physical Society, Mar. 2004, <http://www.aps.org/public_affairs/popa/reports/index.cfm>.
PCT International Preliminary Report on Patentability and Written Opinion for PCT/US2006/041039 dated Apr. 9, 2009, 7 pages.
PCT International Preliminary Report on Patentability and Written Opinion for PCT/US2007/084677 dated May 28, 2009, 7 pages.
PCT International Search Report and Written Opinion for PCT/US08/68938 dated Oct. 10, 2008, 8 pages.
PCT International Preliminary Report on Patentability and Written Opinion for PCT/US2008/051012 dated Aug. 27, 2009, 7 pages.
U.S. Appl. No. 12/603,948, filed Oct. 22, 2009, titled, "Complete Liquefaction Methods and Apparatus," by Turner et al.
U.S. Appl. No. 12/604,139, filed Oct. 22, 2009, titled, "Natural Gas Liquefaction Core Modules, Plants Including Same and Related Methods," by Wilding et al.
U.S. Appl. No. 12/604,194, filed Oct. 22, 2009, titled, "Methods of Natural Gas Liquefaction and Natural Gas Liquefaction Plants Utilizing Multiple and Varying Gas Streams," by Wilding et al.
PCT International Preliminary Report on Patentability and Written Opinion for PCT/US2010/045321 dated Oct. 1, 2010, 6 pages.
PCT International Preliminary Report on Patentability and Written Opinion for PCT/US2010/045332 dated Oct. 18, 2010, 11 pages.
PCT International Search Report and Written Opinion of the International Searching Authority for PCT/US2011/059038, dated Mar. 21, 2012, 8 pages.

* cited by examiner

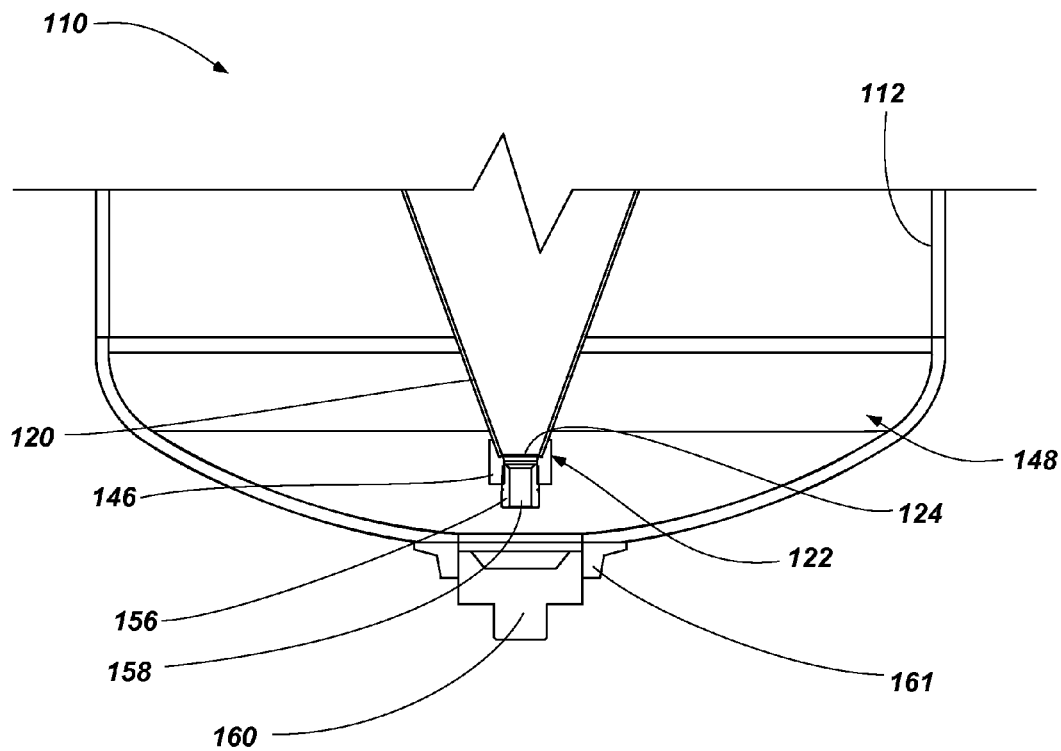
FIG. 3
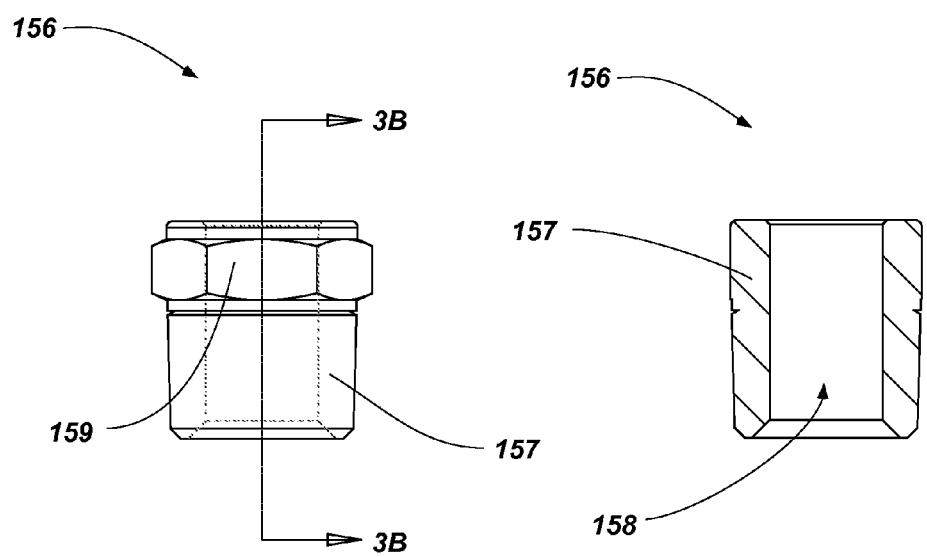
FIG. 4A    FIG. 4B

HEAT EXCHANGER AND RELATED METHODS

GOVERNMENT RIGHTS

This invention was made with government support under Contract Number DE-AC07-05ID14517 awarded by the United States Department of Energy. The government has certain rights in the invention.

CROSS-REFERENCE TO RELATED APPLICATIONS

This application is related to U.S. patent application Ser. No. 11/855,071 filed on Sep. 13, 2007, titled Heat Exchanger and Associated Methods, now U.S. Pat. No. 8,061,413, issued Nov. 22, 2011, U.S. patent application Ser. No. 12/938,761, filed on even date herewith, for Vaporization Chambers and Associated Methods, and U.S. patent application Ser. No. 12/938,967, filed on even date herewith, for Sublimation Systems and Associated Methods, the disclosure of each of which is hereby incorporated by reference in its entirety. This application is also related to U.S. patent application Ser. No. 13/284,737, filed on Oct. 28, 2011, titled Methods of Conveying Fluids and Methods of Sublimating Solid Particles, now U.S. Pat. No. 8,544,295, issued Oct. 1, 2013.

TECHNICAL FIELD

Embodiments of the invention relate generally to heat exchangers and methods associated with the use thereof. More specifically, embodiments of the invention relate to heat exchangers including a housing and a heating member configured to supply a fluid into communication with another fluid. Embodiments of the invention additionally relate to the methods of heat transfer between fluids, the sublimation of solid particles within a fluid, and the conveyance of fluids.

BACKGROUND

The production of liquefied natural gas is a refrigeration process that reduces the mostly methane ($CH_4$) gas to a liquid state. However, natural gas consists of a variety of gases in addition to methane. One of the gases contained in natural gas is carbon dioxide ($CO_2$). Carbon dioxide is found in quantities around 1% in most of the natural gas infrastructure found in the United States, and in many places around the world the carbon dioxide content is much higher.

Carbon dioxide can cause problems in the process of natural gas liquefaction, as carbon dioxide has a freezing temperature that is higher than the liquefaction temperature of methane. The high freezing temperature of carbon dioxide relative to methane will result in solid carbon dioxide crystal formation as the natural gas cools. This problem makes it necessary to remove the carbon dioxide from the natural gas prior to the liquefaction process in traditional plants. The filtration equipment to separate the carbon dioxide from the natural gas prior to the liquefaction process may be large, may require significant amounts of energy to operate, and may be very expensive.

Small-scale liquefaction systems have been developed and are becoming very popular. In most cases, these small plants are simply using a scaled down version of existing liquefaction and carbon dioxide separation processes. The Idaho National Laboratory has developed an innovative small-scale liquefaction plant that eliminates the need for expensive, equipment intensive, pre-cleanup of the carbon dioxide. The carbon dioxide is processed with the natural gas stream, and during the liquefaction step the carbon dioxide is converted to a crystalline solid within a liquid natural gas process stream. The liquid/solid slurry is then transferred to a separation device, which directs a clean natural gas liquid out of an overflow, and a carbon dioxide concentrated slurry out of an underflow.

The underflow slurry is then processed through a heat exchanger to sublime the carbon dioxide back into a gas. In theory this is a very simple step. However, the interaction between the solid carbon dioxide and liquid natural gas produces conditions that are very difficult to address with conventional heat exchangers. In the liquid slurry, carbon dioxide is in a pure or almost pure sub-cooled state and is not soluble in the liquid. The carbon dioxide is heavy enough, relative to the density of the carrier liquid, to quickly settle to the bottom of most flow regimes. As the settling occurs, piping and ports of the heat exchanger can become plugged as the quantity of carbon dioxide builds. In addition to collecting in undesirable locations, the carbon dioxide has a tendency to clump together, making it even more difficult to flush through the system.

The ability to sublime the carbon dioxide back into a gas is contingent on getting the solids past the liquid phase of the gas without collecting and clumping into a plug. As the liquid natural gas is heated, it will remain at approximately a constant temperature of about $-145°$ C. (at 50 psig (approximately 446 kPa)) until all the liquid has passed from a two-phase gas to a single-phase gas. The solid carbon dioxide will not begin to sublime back into a gas until the surrounding gas temperatures have reached approximately $-60°$ C. While the solid carbon dioxide is easily transported in the liquid methane, the ability to transport the solid carbon dioxide crystals to warmer parts of the heat exchanger is substantially diminished as liquid natural gas vaporizes. At a temperature when the moving, vaporized natural gas is the only way to transport the solid carbon dioxide crystals, the crystals may begin to clump together due to the tumbling interaction with each other, leading to the aforementioned plugging.

In addition to clumping, as the crystals reach warmer areas of the heat exchanger they begin to melt or sublime. If melting occurs, the surfaces of the crystals become sticky, causing the crystals to have a tendency to stick to the walls of the heat exchanger and reducing the effectiveness of the heat exchanger and creating localized fouling. The localized fouling areas may cause the heat exchanger may become occluded and eventually plug if fluid velocities are not sufficient to dislodge the fouling.

BRIEF SUMMARY

In accordance with some embodiments of the present invention, a heat exchanger includes a housing having at least one inlet and at least one outlet. The housing forms a portion of a transition chamber within the heat exchanger. The at least one inlet and the at least one outlet are in communication with the transition chamber and the at least one outlet is positioned at an upper portion of the housing. The heat exchanger may further include a heating member disposed within the housing and forming another portion of the transition chamber. The heating member includes a first end having a first opening formed therein, the first opening in communication with a supply of at least one fluid, and a second end having a second opening formed therein, the second opening being larger than the first opening and the second opening being in communication with the transition chamber of the heat exchanger.

In additional embodiments, a method of conveying a fluid includes supplying a first fluid comprising at least one material into a transition chamber of a heat exchanger through an inlet formed in the heat exchanger, supplying a second fluid through an opening formed in an apex of a cone-shaped heating member and into an interior portion of the cone-shaped heating member forming a portion of the transition chamber, altering a state of the at least one material of the first fluid with the second fluid, and conveying the at least one material of the first fluid having the altered state out of the heat exchanger through an outlet of the heat exchanger located in an upper portion of the heat exchanger.

In yet additional embodiments, a method of sublimating solid particles includes conveying a first fluid comprising at least one material in a solid state into a transition chamber of a heat exchanger, heating the at least one material within the first fluid to a gaseous state including directing a second fluid at a temperature higher than a temperature of the first fluid into the transition chamber through a cone-shaped heating member and mixing the first fluid and the second fluid, and conveying the at least one material within the first fluid in the gaseous state out of the transition chamber with the first fluid.

BRIEF DESCRIPTION OF THE DRAWINGS

FIG. 3 is an enlarged, partial longitudinal cross-sectional view of the heat exchanger shown in FIGS. 1 and 2.

FIGS. 4A and 4B are a side view and a cross-sectional view, respectively, of a nozzle that may be used in a nozzle assembly of a heat exchanger in accordance with an embodiment of the present invention.

DETAILED DESCRIPTION

The illustrations presented herein are not meant to be actual views of any particular material, apparatus, system, or method, but are merely idealized representations which are employed to describe embodiments of the present invention. Additionally, elements common between figures may retain the same numerical designation for convenience and clarity.

Figure 1:
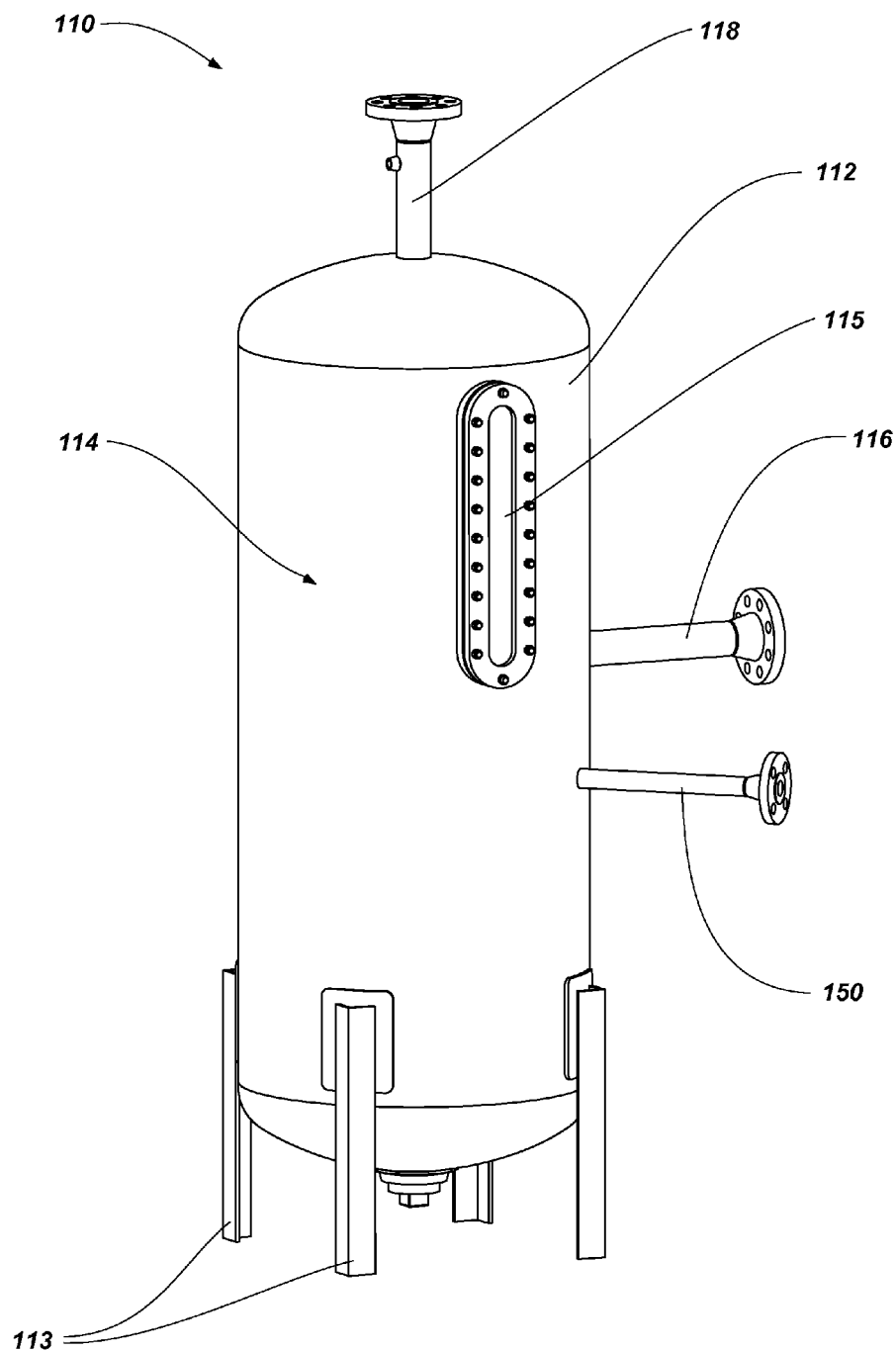
FIG. 1 is an isometric view of a heat exchanger in accordance with an embodiment of the present invention.

FIG. 1 is an isometric view of a heat exchanger. It is noted that, while operation of embodiments of the present invention may be described in terms of the sublimation of carbon dioxide in the processing of natural gas, the present invention may be utilized for the sublimation, heating, cooling, and mixing of other fluids and for other processes, as will be appreciated and understood by those of ordinary skill in the art.

The term "fluid" as used herein means any substance that may be caused to flow through a conduit (e.g., nozzle, pipe, chamber, inlet, outlet, etc.) and includes but is not limited to gases, two-phase gases, liquids, gels, plasmas, slurries, solid particles, and any combination thereof.

Figure 2:
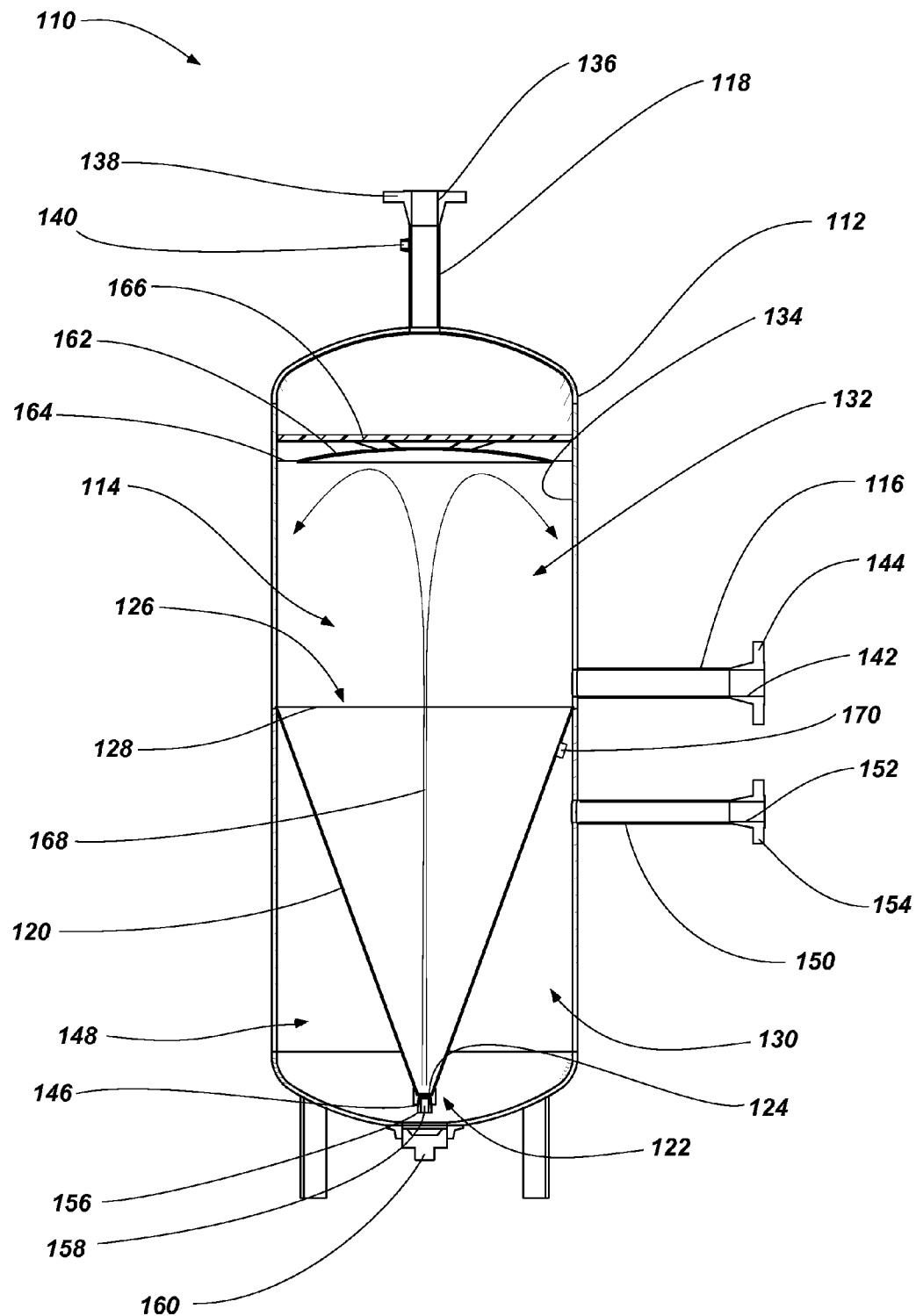
FIG. 2 is a longitudinal cross-sectional view of the heat exchanger shown in FIG. 1.

As shown in FIG. 1, a heat exchanger 110 may comprise a housing 112 (e.g., a tank having legs 113) including a chamber (e.g., a transition chamber 114 which is shown in greater detail in FIG. 2) having an inlet 116 and an outlet 118. It is noted that while the embodiment of FIG. 1 illustrates the housing 112 of the heat exchanger 110 having generally round shape including a circular cross section, the housing 112 may be formed in any suitable shape such as, for example, square, rectangular, oval, irregular, or combinations thereof. By way of example and not limitation, the heat exchanger 110 may include a housing 112 being cylindrical in shape with an outside diameter of approximately 24 inches (approximately 0.61 meter) and an overall height (including the legs 113 and outlet 118) of 79 inches (approximately 2.01 meters). In some embodiments, a view window 115 may be included to visually observe the operation of heat exchanger 110. The view window 115 may be used to observe materials within the heat exchanger 110. For example, as discussed below, the view window 115 may be used to observe the position of solid material suspended in the transition chamber 114, to check for solid material that may be collecting in a filter 166 (FIG. 2), etc.

FIG. 2 is a longitudinal cross-sectional view of the heat exchanger shown in FIG. 1. As shown in FIG. 2, the heat exchanger 110 may include a heating member 120 disposed within the heat exchanger 110. The heating member 120 may include a first end 122 having a first opening 124 formed therein. The heating member 120 may include a second end 126 having a second opening 128 formed therein. In some embodiments, the heating member 120 may be formed from a structure where the first opening 124 is relatively smaller than the second opening 128. In other words, a cross-sectional area of the first opening 124 is smaller than a cross-sectional area of the second opening 128. For example, the heating member 120 may comprise a substantially cone-shaped member (e.g., a cone having a base such as, for example, a circular base, a polygonal base, etc.). In such an embodiment, the first opening 124 may be formed in an apex of the heating member 120 and the second opening 128 may be formed proximate a base of the heating member 120. Further, an inner portion of the heating member 120 may include substantially diagonal side surfaces extending between the first opening 124 and the second opening 128.

In some embodiments and as shown in FIG. 2, the second opening 128 may be substantially larger than the first opening 124. For example, the first opening 124 of the heating member 120 may be disposed in a lower portion 130 of the housing 112 of the heat exchanger 110. The terms "lower" and "upper" as used herein reference the heat exchanger 110 as it is oriented in FIGS. 1 and 2. For example, an "upper" portion of the housing 112 of the heat exchanger 110 may be positioned relatively more distant from a structure (e.g., floor) on which the heat exchanger 110 is disposed and a "lower" portion is relatively closer in proximity to the structure on which the heat exchanger 110 is disposed. The second opening 128 may be disposed between the lower portion 130 and an upper portion 132 of the housing 112 of the heat exchanger 110. The second opening 128 may be sized to form a portion of the transition chamber 114. For example, an inner portion of the heating member 120 may form a lower portion of the transition chamber 114. In some embodiments, the base of the heating member 120 may be attached to a portion of the housing 112 (e.g., an inner surface 134 of the housing 112). In some embodiments, the transverse, cross-sectional area of the second opening 128 may be substantially the same as the transverse, cross-sectional area of a portion of the housing 112. It is noted that while the heating member 120 in shown and described with reference to FIG. 2 as having a cone shape, the heating member 120 may be formed in any suitable shape such as, for example, tubular, rectilinear, polygonal, cardioid, curvilinear, or combinations thereof.

Referring still to FIG. 2, the outlet 118 of the heat exchanger 110 may include an exit nozzle 136 having a flange 138. In some embodiments, the exit nozzle 136 may be positioned on the upper portion 132 of the housing 112 of the heat exchanger 110. For example, as shown in FIG. 2, the exit nozzle 136 may be positioned on the uppermost portion of the housing 112 of the heat exchanger 110. In some embodiments, placement of the exit nozzle 136 at the upper portion 132 of the housing 112 may enable gaseous material (i.e., material in a gaseous state) within the transition chamber 114 to exit the transition chamber 114 while retaining materials in a nongaseous state (e.g., liquid, solid, etc.) within the transition chamber 114. In some embodiments, the exit nozzle 136 may be configured to be in communication (e.g., fluid communication) with one or more downstream components and may be coupled to the downstream components via the flange 138. For example, the exit nozzle 136 may be sized to provide interconnections to downstream components (e.g., a gas outlet, another heat exchanger, an outlet to the atmosphere, etc.) and to provide gaseous material to downstream components at an acceptable or desirable velocity. In some embodiments, the downstream components may include one or more components of a liquefied natural gas (LNG) system such those disclosed in, for example, U.S. patent application Ser. No. 12/604,139, filed Oct. 22, 2009, for Natural Gas Liquefaction Core Modules, Plants Including Same and Related Methods; U.S. patent application Ser. No. 12/603,948, filed Oct. 22, 2009, for Complete Liquefaction Methods and Apparatus; and U.S. patent application Ser. No. 12/604,194, filed Oct. 22, 2009, for Methods of Natural Gas Liquefaction and Natural Gas Liquefaction Plants Utilizing Multiple and Varying Gas Streams. The disclosure of each of the foregoing applications referenced in this paragraph is hereby incorporated by reference in its entirety.

In some embodiments, the exit nozzle 136 may include a port (e.g., a threaded port 140) enabling connection of a sensor (e.g., a thermocouple, resistance temperature detector (RTD), a velocity sensor, etc.) for monitoring of the properties of the gases exiting the transition chamber 114. In some embodiments, the heat exchanger 110 may include one or more ports located at various positions in the housing 112 (e.g., proximate the transition chamber 114, heated fluid chamber 148, etc.) enabling monitoring of the properties of the materials contained in the heat exchanger 110.

The inlet 116 of the heat exchanger 110 may include inlet nozzle 142 having a flange 144. In some embodiments, the inlet nozzle 142 may be positioned at a midportion of the housing 112 of the heat exchanger 110 (e.g., between the lower portion 130 and upper portion 132 of the housing 112. For example, the inlet nozzle 142 may be positioned proximate to the second opening 128 at the second end 126 of the heating member 120. Such placement of the inlet nozzle 142 may enable a fluid to be supplied to the heat exchanger 110 at the second opening 128 at the second end 126 of the heating member 120. For example, a fluid (e.g., a gaseous material) including a material in a nongaseous state (e.g., a fluid, vapor, solid, etc.) may be supplied to the housing 112 of the heat exchanger 110 such that the portion of the fluid in the nongaseous state will be displaced (e.g., under a gravitational force) into the inner portion of the heating member 120 in a direction toward the first opening 124 at the first end 122 of the heating member 120.

The inlet nozzle 142 may be in communication (e.g., fluid communication) with one or more upstream components and may be coupled to the upstream components via the flange 144. For example, the inlet nozzle 142 may be sized to provide interconnections to upstream components (e.g., a vaporization chamber, another heat exchanger, a device configured to separate materials or differing states of materials (e.g., a hydrocyclone), etc.) and to provide gaseous material to upstream components at an acceptable or desirable velocity. In some embodiments, the upstream components may include one or more of the components, for example, disclosed in the above-referenced and incorporated by reference, U.S. patent application Ser. Nos. 12/604,139, 12/603,948, and 12/604,194. Further, in some embodiments, one or more upstream components may include one or more of the components disclosed in, for example, U.S. patent application Ser. No. 12/938,761, filed on even date herewith, for Vaporization Chambers and Associated Methods, the disclosure of which is hereby incorporated by reference in its entirety. For example, the inlet nozzle 142 may be coupled to the vaporization chamber disclosed in the above-referenced and incorporated by reference U.S. patent application Ser. No. 12/938, 967, filed on even date herewith, for Sublimation Systems and Associated Methods. In such an embodiment, the inlet nozzle 142 may supply a fluid such as, for example, a fluid carrier (e.g., a gas or liquid) containing a material such as, for example, a particulate (e.g., a solid or liquid particulate) to the heat exchanger 110 from the vaporization chamber.

The heating member 120 may include a nozzle assembly 146 disposed at the first end 122 of the heating member 120. The nozzle assembly 146 may at least partially form the first opening 124 of the heating member 120. The nozzle assembly 146 may supply a fluid to a portion of the heat exchanger 110 (e.g., to the transition chamber 114). In some embodiments, the nozzle assembly 146 may be in communication with a volume of fluid (e.g., a fluid at a higher temperature than a fluid supplied to the heat exchanger 110 via the inlet nozzle 142). For example, the nozzle assembly 146 may be in communication with a volume of fluid in a heated fluid chamber 148. The heated fluid chamber 148 may be formed in the heat exchanger 110 at a lower portion 130 of the housing 112. In some embodiments, a portion of the housing 112 and a portion of the heating member 120 coupled to the housing 112 may form the heated fluid chamber 148. Fluid may be supplied to the heated fluid chamber 148 by an inlet 150 having an inlet nozzle 152 and a flange 154 for coupling to a source of the fluid. It is noted that, for clarity, the inlet 150 is depicted as being positioned in substantially the same plane as inlet 116. However, in some embodiments, inlet 150 may be offset from inlet 116 as depicted in FIG. 1. In other embodiments, a supply of fluid (e.g., an external chamber, pressure vessel, etc.) may be coupled directly to the nozzle assembly 146. It is further noted that while the heating member 120 shown and described in with reference to FIG. 2 includes a nozzle assembly 146, in some embodiments, the heating member 120 may be formed without a nozzle assembly.

FIG. 3 is an enlarged, partial longitudinal cross-sectional view of the heat exchanger shown in FIGS. 1 and 2. As shown in FIG. 3, the nozzle assembly 146 may include a nozzle 156 coupled to a portion of the nozzle assembly 146. As shown in greater detail in FIGS. 4A and 4B, the nozzle 156 includes a nozzle body 157 having an orifice 158 formed therein. The orifice 158 formed in the body 157 of the nozzle 156 may be sized to provide a desired flow of the fluid from the heated fluid chamber 148 at a desired velocity into the interior portion of the heating member 120 and the transition chamber 114. For example, the orifice 158 formed in the body 157 of the nozzle 156 may have a diameter of approximately 0.625 (⅝) inch (approximately 1.559 cm). In some embodiments, the nozzle 156 may formed from be a modified pipe plug (e.g., a SWAGELOK® pipe plug available from the SWAGELOK® Company of Solon, Ohio) modified to have an orifice extending therethrough. In some embodiments, the body 157 of the nozzle 156 may include an attachment portion 159 (e.g., a hexagonal portion) for facilitating coupling the nozzle 156 to a portion of the heat exchanger 110 (e.g., the nozzle assembly 146 or the heating member 120).

Referring still to FIG. 3, the nozzle 156 may be received in the nozzle assembly 146. The nozzle assembly 146 may be coupled to a portion of the heating member 120 (e.g., by, swaging, adhesion, welding, brazing, etc.) proximate the first end 122 and the first opening 124 of the heating member 120. The nozzle 156 may be coupled to the nozzle assembly 146 (e.g., by, swaging, adhesion, welding, brazing, etc.) In some embodiments, the nozzle 156 may be removably coupled to the nozzle assembly 146. For example, the nozzle 156 may be threaded into a portion of the nozzle assembly 146. Such a removable nozzle 156 may enable different nozzle sizes to be interchangeably used with the heat exchanger 110. In some embodiments, the nozzle 156 may be accessed (e.g., to adjust the nozzle 156, to change nozzle sizes, etc.) in the heat exchanger 110 through a removable portion 160 of the housing 112 that may be removably secured (e.g., threaded) to a portion of the housing 112 (e.g., a retaining portion 161).

Referring back to FIG. 2, in some embodiments, the nozzle assembly 146 or portion thereof may be adjustable (e.g., manually or automatically adjustable) to adjust the flow rate and velocity of the fluid flowing through the nozzle assembly 146 at the first end 122 of the heating member 120 and into the transition chamber 114. In some embodiments, pressure of the fluid in the heated fluid chamber 148 may be adjusted to provide the desired fluid flow and fluid velocity into the transition chamber 114 through the nozzle assembly 146.

It is noted that while the embodiment of FIG. 2 illustrates the heat exchanger 110 including a nozzle assembly 146, in some embodiments, the fluid flow and fluid velocity into the transition chamber 114 of the heat exchanger 110 may be controlled by other means such as, for example, by one or more valves, by the heating member 120 itself, by one or more flow regulators, etc.

In some embodiments, the heat exchanger 110 may include particle barrier located in the upper portion 132 of the housing 112 of the heat exchanger 110. For example, a deflection plate 162 may be positioned in the upper portion 132 of the housing 112. In some embodiments, the deflection plate 162 may have a substantially concave surface oriented in a direction toward the heating member 120 (i.e., a concave surface of the deflection plate 162 may face the heating member 120). In some embodiments, the deflection plate 162 may have a size that is smaller than the interior of the housing 112 of heat exchanger 110. For example, a diameter of the deflection plate 162 may be less than an inner diameter of the housing 112. The deflection plate 162 may be suspended within the housing 112 by supports 164. The supports 164 may be coupled to the deflection plate 162 and may extend to the inner surface 134 of the housing 112 and may be coupled thereto. The supports 164 and the deflection plate 162 be sized in the housing 112 to provide channels around the deflection plate 162 proximate to the inner surface 134 of the housing 112 enabling fluid to pass from the transition chamber 114 around the deflection plate 162 and to the outlet 118 of the heat exchanger 110. It is noted that while the embodiment of FIG. 2 illustrates the deflection plate 162 having a concave shape, the deflection plate 162 may be formed in any suitable shape (e.g., flat, v-shaped, etc.).

In some embodiments, a particle barrier of the heat exchanger 110 may include a filter 166 disposed in the housing 112 of the heat exchanger 110. For example, the filter 166 may be positioned in the upper portion 132 of the housing 112 between the deflection plate 162 and the outlet 118 of the heat exchanger 110. The filter 166 may be formed from any material capable of at least partially restricting flow of a solid or liquid and at least partially enabling flow of a fluid (e.g., a gas) therethrough. For example, the filter 166 may be formed from a stainless steel demister, a woven wire mesh, a fiber mesh, etc. In some embodiments, the filter 166 may be supported in the heat exchanger 110 by the deflection plate 162, the supports 164, or both the deflection plate 162 and the supports 164. In some embodiments, the filter 166 may be attached to a portion of the housing 112. In some embodiments, the filter 166 may substantially fill a portion of the heat exchanger 110 extending between the deflection plate 162 and the outlet 118 of the heat exchanger 110.

In some embodiments, a fluid bypass 170 (e.g., a gas bypass valve) may be disposed between the heated fluid chamber 148 and the transition chamber 114. For example, the fluid bypass 170 may be located proximate to the second end 126 of the heating member 120. The fluid bypass 170 may enable the flow rate and velocity of a fluid to be reduced through the nozzle 156 by venting a portion of the fluid in the heated fluid chamber 148 directly into the transition chamber 114 bypassing the nozzle 156. In other words, the fluid bypass 170 may vent a portion of the fluid within the heated fluid chamber 148 into the transition chamber 114, thereby, reducing a pressure of the fluid within the heated fluid chamber 148.

With continued reference to FIG. 2, in operation, the inlet nozzle 142 of the inlet 116 may supply a first fluid such as, for example, a fluid carrier (e.g., a gas or liquid) containing particles of a material such as, for example, a particulate (e.g., a solid or liquid particulate) to the heat exchanger 110. For example, a first fluid may include a fluid carrier (e.g., a natural gas) in a substantially gaseous state (e.g., a gas carrier) including a nongaseous material (e.g., a particulate such as, for example, particles of $CO_2$). In some embodiments, the first fluid including the gas carrier and particulate may be supplied by the inlet nozzle 142 at a temperature lower than the sublimation temperature of the particulate in order to provide a first fluid into the transition chamber 114 of the heat exchanger 110 having particulates in a solid state.

As the first fluid is supplied to the transition chamber 114 in the housing 112 of the heat exchanger 110, the temperature of the first fluid or portions thereof may be increased by a second fluid (e.g., a heating fluid). For example, the second fluid (e.g., a methane gas, for example, a methane gas provided from a LNG system that has been previously processed in the system to substantially remove particles of $CO_2$ therefrom) may be supplied through the inlet nozzle 152 of the inlet 150. In some embodiments, the second fluid may be supplied to the heat exchanger 110 at a temperature greater than a temperature in the transition chamber 114. For example, the second fluid supplied the heat exchanger 110 at a temperature greater than the temperature of one or more fluids (e.g., a portion of the first fluid) in the transition chamber 114. By way of further example, the first fluid may comprise particles of $CO_2$ in a methane carrier and the second fluid may be supplied to the heat exchanger 110 (e.g., into the heated fluid chamber 148) at a temperature that is greater than the sublimation temperature of the $CO_2$ particles (e.g., approximately −80° C. to −60° C. (this temperature may vary depending upon the pressure of the fluid environment)). In some embodiments, the second fluid may be heated in the heated fluid chamber 148 of the heat exchanger 110 to exhibit a temperature greater than a temperature in the transition chamber 114.

The second fluid may enter the heat exchanger 110 through the inlet nozzle 152 and into the heated fluid chamber 148. In some embodiments, the second fluid may be pressurized in the heated fluid chamber 148 (e.g., by supplying the second fluid through the inlet nozzle 152 at a rate greater than the rate that the second fluid is removed from the heated fluid chamber 148 into the transition chamber 114). In some embodiments, the second fluid in transition chamber 114 may act to heat a surface forming the transition chamber 114. For example, as discussed above, the second fluid within the heated fluid chamber 148 may heat a surface of the heating member 120, which forms a portion of the transition chamber 114. Heating a surface of the heating member 120 may act to increase the temperature of the heating member 120 and to at least partially prevent particles from attaching or sticking to the surfaces of the heating member 120.

The nozzle assembly 146 and, in particular, the orifice 158 of the nozzle 156 may act to supply the second fluid into the transition chamber 114 through the first opening 124 at the first end 122 of the heating member 120. The nozzle 156 may be sized to provide a jet (e.g., a relatively high-velocity, high-pressure jet) of a second fluid 168 that may travel through the nozzle 156 into the transition chamber 114 in a direction toward the upper portion 132 of the housing 112. It is noted that the jet of second fluid 168 is illustrated in FIG. 2 by two lines for the purposes of describing exemplary embodiments of the present disclosure and is not limiting. As the second fluid enters the heating member 120 and progresses upward toward the upper portion 132 of the housing 112, the velocity profile of jet of second fluid 168 may be altered. For example, as the diameter of the heating member 120 increases, the velocity of the jet of second fluid 168 will be reduced as the jet of second fluid 168 travels from the second opening 128 at the second end 126 of the heating member 120 toward the upper portion 132 of the housing 112.

The jet of second fluid 168 may form a column of gas that elevates the first fluid, including any particulate therein, from the lower portion 130 of the housing 112 proximate the heating member 120 toward the upper portion 132 of the housing 112. As the jet of second fluid 168 elevates the first fluid, including any particulate therein, the jet of second fluid 168 may act to heat the second fluid. The transition chamber 114 may enable the first fluid and the second fluid to mix and enable energy (e.g., heat) contained in the second fluid to transfer to the first fluid, thereby, altering a state (e.g., phase) of at least a portion of the first fluid.

For example, the first fluid may enter into the heat exchanger 110 at the inlet 116 that is located in a relatively lower velocity area as compared to an area in the housing 112 proximate to the jet of second fluid 168 extending from the nozzle 156 at the first end 122 of the heating member 120. Once in housing 112, a portion of gas or liquid contained the first fluid (e.g., gaseous or liquid methane) may be swept toward the outlet 118 of the heat exchanger 110 (e.g., as the gas or liquid tends to flow to a region of the housing 112 proximate the outlet 118 having a relatively lower pressure). In some embodiments, a portion of gas or liquid contained the first fluid may be heated once in the transition chamber 114 and may be swept (e.g., by the force of the jet of second fluid 168) to the outlet 118 of the heat exchanger 110 and removed from the heat exchanger 110. For example, material in a gaseous state in the first fluid may enter the housing 112 through the inlet 116 and the relatively higher temperatures in the transition chamber 114 provided by the jet of second fluid 168 may act to heat and direct the material in the gaseous state to the outlet 118 of the heat exchanger 110. Similarly, material in a liquid state in the first fluid may enter the housing 112 through the inlet 116. The material in the liquid state may travel toward the lower portion 130 of the housing 112 proximate the heating member 120 under a gravitation force. The relatively higher temperatures in the transition chamber 114 provided by the jet of second fluid 168 may act to heat and vaporize the material in the liquid state. After vaporization, the material, now in a gaseous state, may be further heated and directed to the outlet 118 of the heat exchanger 110.

Particles (e.g., particulates, solids, liquids, etc.) in the first fluid (e.g., particles of $CO_2$) may fall under a gravitation force in a direction toward the jet of second fluid 168 at the first end 122 of the heating member 120. The cone-shaped heating member 120 may act to direct the particles toward the jet of second fluid 168. In other words, the cone-shaped heating member 120 may direct the particles downward through an inner portion of the heating member 120 along the diagonal sides of the heating member 120 toward the relatively smaller first opening 124 of the heating member 120. Further, the surface of the heating member 120 heated by the second fluid contained in the heated fluid chamber 148 may act to heat the particles as the particles travel downward through the heating member 120 toward the jet of second fluid 168 extending from the nozzle 156. As the particles travel toward the jet of second fluid 168, the particles may be swept up in the jet of second fluid 168 and elevated in a direction toward the upper portion 132 of the housing 112. For example, the jet of second fluid 168 may create a fluidized bed of particles. When the particles are located in the jet of second fluid 168, the velocity of the jet of second fluid 168 may act to elevate and rotate the particles enabling heating of the particles on a substantial portion of the external surface area of the particles. In some embodiments, the nozzle 156 and the second fluid 168 (e.g., the pressure of the second fluid in the heated fluid chamber 148, the size and shape of the nozzle 156, or combinations thereof) may be selected to provide a jet of second fluid 168 that may suspend an average-sized particle at a midsection of the heating member 120 between the first end 122 and second end 126. The velocity variance of the jet of second fluid 168 in the heating member 120 extending from the first opening 124 toward the second opening 128 may act to suspend the particles in the heating member 120 based on the size and weight of each particles. For example, the nozzle 156 and the second fluid 168 may be selected to provide a jet of second fluid 168 having a velocity of approximately 120 feet per second (ft/sec) (approximately 36.6 meters per second (m/s)) proximate to the nozzle 156 at the first end 122 of the heating member 120. Further, the heating member 120 and the housing 112 may be sized to provide a velocity of the jet of second fluid 168 proximate the second end 126 of the heating member of approximately 0.13 feet per second (ft/sec) (approximately 0.04 meters per second (m/s)). As the particles float in the stream of relatively warmer gas provided by the jet of second fluid 168, the particles may be heated and the state of the particles may be altered to a gaseous state. As portions of each particle are converted to a gaseous state, the particles will reduce in size and weight, enabling the particles to float higher in the transition chamber 114, until the particles are substantially completely altered to a gaseous state (e.g., sublimed).

In some embodiments, the particles may be elevated to the deflection plate 162 located in the upper portion 132 of the heat exchanger 110. The deflection plate 162 may act to direct the particles toward an area of relatively lower velocity proximate to outer portions of the housing 112 (e.g., proximate to the inner surface 134 of the housing 112) and away from the central portion of the housing 112 having the jet of second fluid 168 extending therethrough. In some embodiments, the deflection plate 162 may also act to redirect the jet of second fluid 168 toward outer portions of the housing 112 and may act to force the particles downward toward the heating member 120. In some embodiments, as the velocity of the jet of second fluid 168 decreases as it approaches the upper portion 132 of the housing 122, the particles may travel away from the central portion of the housing 112 and the path of the jet of second fluid 168 and may fall back toward the heating member 120.

As before, once the particles are located in a relatively lower velocity area as compared to an area in the housing 112 proximate to the jet of second fluid 168 extending from the nozzle 156 at the first end 122 of the heating member 120, the particles may fall under a gravitation force in a direction toward the jet of second fluid 168 at the first end 122 of the heating member 120. The process heating and elevating the particles may be repeated until the temperature of the particles have been raised to sufficiently transition the particles to a different state of matter (e.g., to a gaseous state). For example, particles of $CO_2$ (e.g., solid crystals of $CO_2$) may be supplied to the heat exchanger 110 through the inlet 116 at a temperature lower than the sublimation temperature of $CO_2$ (e.g., −60° C. (this temperature may vary depending upon the pressure of the fluid environment)). The particles of $CO_2$ may fall under a gravitation force and be elevated by the jet of second fluid 168, as described above, until the temperature of the particles of $CO_2$ is raised to above the sublimation temperature of $CO_2$. The particles of $CO_2$ may begin to sublimate into a gaseous state and may travel (e.g., be directed by the jet of second fluid 168) toward the outlet 118 of the heat exchanger 110.

The filter 166 disposed in the upper portion 132 of the heat exchanger 110 may also act to restrict flow of particles traveling toward the outlet 118 and trap the particles therein. In some embodiments, gradual heating of the particles trapped in the filter may transition the particles to a gaseous state, which may then travel through the filter 166 to the outlet 118 of the heat exchanger 110.

Figure 5:
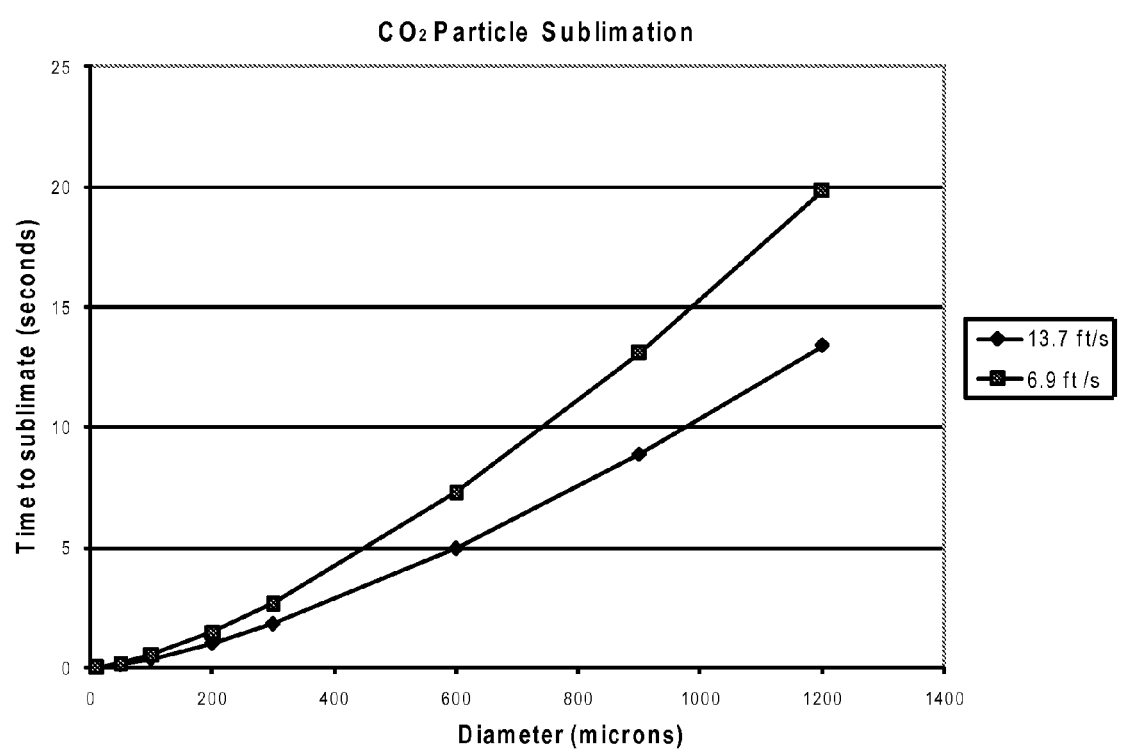
FIG. 5 is graph depicting projected sublimations times for particles (e.g., $CO_2$ particles) based on particle size when such particles are disposed within a heat exchanger in accordance with an embodiment of the present invention.

FIG. 5 is graph depicting projected sublimations times for particles (e.g., $CO_2$ particles) based on particle size when such particles are disposed within a heat exchanger in accordance with an embodiment of the present invention (e.g., heat exchanger 110 (FIG. 2)). In the graph, $CO_2$ particles are considered as spheres suspended in a moving gas stream (e.g., the jet of second fluid 168 (FIG. 2)). As shown in FIG. 5, diameter sizes of $CO_2$ particles ranging between 0 to 1200 microns are shown on the x-axis. The resulting sublimation times in seconds is shown on the y-axis. Further, two sets of data points are shown, one representing a gas steam (e.g., the jet of second fluid 168 extending from the nozzle 156 (FIG. 2)) having a temperature of 96° C. and a velocity of 6.9 feet per second (ft/sec) (approximately 2.1 meters per second (m/s)) and another set representing a gas steam having a temperature 96° C. and a velocity of 13.7 ft/sec (approximately 4.2 m/s). As can be seen from FIG. 5, the sublimation time of $CO_2$ particles vary depending on the size of the particles and the velocity and temperature of the jet of heating fluid. On average, $CO_2$ particles having a diameter of about 600 to 800 microns may reside in the heat exchanger in a solid state for about 5 to 12 seconds before being sublimated into gaseous $CO_2$.

In view of the above, embodiments of the present invention may be particularly useful in providing an apparatus and methods enabling the effective and efficient conveyance and sublimation of solid particles within a fluid. Embodiments of the present invention may further be useful for a variety of applications other than the specific examples provided. For example, the described apparatus and methods may be useful for the effective and efficient mixing, heating, cooling, and/or conveyance of fluids containing sticky, corrosive, and/or reactive chemicals.

While the invention may be susceptible to various modifications and alternative forms, specific embodiments of which have been shown by way of example in the drawings and have been described in detail herein, it should be understood that the invention is not intended to be limited to the particular forms disclosed. Rather, the invention includes all modifications, equivalents, and alternatives falling within the scope of the invention as defined by the following appended claims and their legal equivalents.

What is claimed is:

1. A method of conveying a fluid, the method comprising:
    supplying a first fluid comprising at least one material into a transition chamber of a heat exchanger through a first inlet at a first location in the heat exchanger;
    supplying a second fluid into the heat exchanger through a second inlet at a second location in the heat exchanger;
    supplying the second fluid into the transition chamber through an opening formed in an apex of a cone-shaped heating member and into an interior portion of the cone-shaped heating member forming a portion of the transition chamber;
    altering a state of the at least one material of the first fluid with the second fluid; and
    conveying the at least one material of the first fluid having the altered state out of the heat exchanger through an outlet of the heat exchanger located in an upper portion of the heat exchanger, wherein the outlet of the heat exchanger located in the upper portion of the heat exchanger is positioned relatively higher in the heat exchanger than both the first location of the first inlet and the second location of the second inlet.

2. The method of conveying a fluid of claim 1, wherein supplying the first fluid comprising at least one material into the transition chamber of the heat exchanger comprises supplying a first fluid comprising at least one gaseous material and at least one solid material into the transition chamber of the heat exchanger and wherein altering a state of the at least one material of the first fluid with the second fluid comprises transitioning the at least one solid material to at least another gaseous material with the second fluid.

3. The method of conveying a fluid of claim 2, wherein conveying the at least one material of the first fluid comprises conveying the at least one gaseous material and at least one solid material through the outlet.

4. The method of conveying a fluid of claim 1, wherein supplying the second fluid through the apex of the cone-shaped heating member comprises:
    supplying the second fluid through the second inlet formed in the heat exchanger and into a heated fluid chamber at least partially surrounding the cone-shaped heating member and in communication with the opening formed in the apex of the cone-shaped heating member; and
    requiring the second fluid to enter the interior portion of the cone-shaped heating member through the opening formed in the apex of the cone-shaped heating member to substantially isolate the heated fluid chamber from the interior portion of the cone-shaped heating member.

5. The method of conveying a fluid of claim 4, further comprising heating a surface of the cone-shaped heating member with the second fluid in the heated fluid chamber.

6. The method of conveying a fluid of claim 1, further comprising:
    supplying the first fluid at a first temperature into the transition chamber;
    supplying the second fluid at a second temperature greater than the first temperature; and conveying the first fluid and the second fluid out of the transition chamber through the outlet at a third temperature different than each of the first temperature and the second temperature.

7. The method of conveying a fluid of claim 6, further comprising:
supplying at least one material of the first fluid into the transition chamber in a solid state; and
conveying the at least one material of the first fluid out of the transition chamber in a gaseous state.

8. The method of conveying a fluid of claim 1, further comprising:
supplying at least one material of the first fluid into the transition chamber in a solid state; and
forcing the at least one material of the first fluid in the solid state away from the apex of the cone-shaped heating member with the second fluid.

9. A method of conveying a fluid, the method comprising:
supplying a first fluid comprising at least one material into a transition chamber of a heat exchanger through a first inlet at an upper portion of the heat exchanger;
supplying a second fluid through a heating member disposed within the heat exchanger and forming a portion of the transition chamber, comprising:
supplying the second fluid through a first end of the heating member, the first end positioned at a lower portion of the heat exchanger, the heating member having a first opening at the first end that is smaller than a second opening of the heating member at a second end of the heating member, an entirety of the second opening and the second end of the heating member being positioned relatively higher in the heat exchanger than an entirety of the first opening and the first end of the heating member and positioned proximate the upper portion of the heat exchanger and the inlet and being in communication with the transition chamber of the heat exchanger;
altering a state of the at least one material of the first fluid with the second fluid;
conveying the at least one material of the first fluid having the altered state out of the heat exchanger through an outlet of the heat exchanger located in the upper portion of the heat exchanger; and
directing at least a portion of at least one of the first fluid and the second fluid within the transition chamber in a direction toward the heating member with a deflection plate disposed in the upper portion of the housing between the second end of the heating member and the outlet.

10. The method of conveying a fluid of claim 9, further comprising heating a surface of the heating member.

11. The method of conveying a fluid of claim 10, wherein heating a surface of the heating member comprises supplying the second fluid at a temperature greater than a temperature of a fluid within the transition chamber to a heated fluid chamber positioned proximate and at least partially surrounding the heating member.

12. The method of conveying a fluid of claim 9, further comprising flowing the second fluid through a nozzle assembly disposed at the first end of the heating member.

13. The method of conveying a fluid of claim 11, further comprising separating the heated fluid chamber from the transition chamber with the heating member to substantially prevent the second fluid in the heated fluid chamber from being placed in communication with the first fluid in the transition chamber except through the first opening in the heating member.

14. The method of conveying a fluid of claim 9, further comprising at least partially restricting flow of at least one of a liquid and a solid from the transition chamber to the outlet with a filter disposed within the housing between the transition chamber and the outlet.

15. A method of conveying a fluid, the method comprising:
conveying a first fluid comprising at least one material in a solid state into a transition chamber of a heat exchanger;
heating the at least one material within the first fluid to a gaseous state comprising:
heating at least a portion of a cone-shaped heating member positioned in the heat exchanger with a second fluid at a temperature higher than a temperature of the first fluid in a heated fluid chamber at least partially surrounding the cone-shaped heating member;
directing the second fluid from the heated fluid chamber and into the cone-shaped heating member through only an opening formed in the cone-shaped heating member to substantially prevent the second fluid in the heated fluid chamber from being placed in communication with the first fluid in the interior portion of the cone-shaped heating member except through the opening in the cone-shaped member; and
mixing the first fluid and the second fluid; and
conveying the at least one material within the first fluid in the gaseous state out of the transition chamber with the first fluid.

16. The method of conveying a fluid of claim 15, wherein:
conveying the first fluid comprising at least one material comprises conveying solid carbon dioxide and at least one of liquid methane and gaseous methane; and
conveying the at least one material within the first fluid in the gaseous state out of the transition chamber with the first fluid and the second fluid comprises conveying gaseous methane and gaseous carbon dioxide out of the transition chamber.

* * * * *

UNITED STATES PATENT AND TRADEMARK OFFICE
CERTIFICATE OF CORRECTION

PATENT NO.         : 9,217,603 B2
APPLICATION NO.    : 12/938826
DATED              : December 22, 2015
INVENTOR(S)        : Terry D. Turner and Michael G. McKellar Page 1 of 1

It is certified that error appears in the above-identified patent and that said Letters Patent is hereby corrected as shown below:

In the claims:
CLAIM 16, COLUMN 14, LINE 44,    change "conveying the first" to --conveying a first--

Signed and Sealed this
Twenty-third Day of August, 2016

Michelle K. Lee
*Director of the United States Patent and Trademark Office*